United States Patent
Shabi et al.

(10) Patent No.: US 11,829,341 B2
(45) Date of Patent: Nov. 28, 2023

(54) SPACE-EFFICIENT PERSISTENT HASH TABLE DATA STRUCTURE

(71) Applicant: Dell Products L.P., Round Rock, TX (US)

(72) Inventors: Uri Shabi, Tel Mond (IL); Bar Harel, Tel Aviv (IL); Nir Bar Joseph, Giv'atayim (IL)

(73) Assignee: Dell Products L.P., Round Rock, TX (US)

( * ) Notice: Subject to any disclaimer, the term of this patent is extended or adjusted under 35 U.S.C. 154(b) by 35 days.

(21) Appl. No.: 17/709,995

(22) Filed: Mar. 31, 2022

(65) Prior Publication Data

US 2023/0315706 A1 Oct. 5, 2023

(51) Int. Cl.
| | |
|---|---|
| *G06F 16/00* | (2019.01) |
| *G06F 16/22* | (2019.01) |
| *G06F 16/215* | (2019.01) |
| *G06F 16/18* | (2019.01) |

(52) U.S. Cl.
CPC ........ *G06F 16/2255* (2019.01); *G06F 16/215* (2019.01); *G06F 16/1805* (2019.01)

(58) Field of Classification Search
CPC . G06F 16/1805; G06F 16/215; G06F 16/2255
See application file for complete search history.

(56) References Cited

U.S. PATENT DOCUMENTS

| | | | |
|---|---|---|---|
| 9,256,368 B2 | 2/2016 | Welnicki et al. | |
| 9,268,653 B2 | 2/2016 | Kimmel et al. | |
| 11,119,997 B2 | 9/2021 | Gurajada et al. | |
| 2004/0117600 A1* | 6/2004 | Bodas | H04L 69/161 |
| | | | 712/210 |
| 2014/0301394 A1* | 10/2014 | Arad | G06F 16/245 |
| | | | 370/392 |
| 2016/0321294 A1* | 11/2016 | Wang | H04L 67/568 |
| 2018/0054386 A1* | 2/2018 | Lee | H04L 45/021 |
| 2021/0133244 A1 | 5/2021 | Harel et al. | |

OTHER PUBLICATIONS

Harel, et al.; "Amoritized Execution of Updates to a Hardened Hash Table," U.S. Appl. No. 16/669,834, filed Oct. 31, 2019.

* cited by examiner

*Primary Examiner* — Diedra McQuitery
(74) *Attorney, Agent, or Firm* — BainwoodHuang

(57) ABSTRACT

Updates are applied to a multi-entry bucket of a persistent multi-bucket hash table indexed by a hash index having a bucket portion and a collision portion, each entry of each bucket storing a corresponding value. The bucket is initially stored in a buffer and both a hash lookup structure and value lookup structure are generated for the bucket, the hash lookup structure usable to identify an entry of the bucket based on collision portion, the value lookup structure usable to identify an entry of the bucket based on value. For each update, a value of the update is applied to the value lookup structure to identify a corresponding entry, and the entry in the buffer is modified as required by the update. Subsequently the bucket in the buffer is persisted back to the hash table using the hash lookup structure.

18 Claims, 3 Drawing Sheets

SPACE-EFFICIENT PERSISTENT HASH TABLE DATA STRUCTURE

BACKGROUND

The disclosed technique relates generally to systems employing persistent (i.e., non-volatile) hash tables as specialized data structures, and more particularly to a manner of efficiently organizing a hash table and applying updates to it. In one example, the hash table is used as a deduplication index in connection with a non-volatile disk cache in a data storage system.

SUMMARY

A method is disclosed of applying a set of updates to a multi-entry bucket of a persistent multi-bucket hash table which is indexed by a hash index having a bucket portion and a collision portion, the bucket portion identifying a bucket, each entry of each bucket storing a corresponding value. The method includes initially storing the bucket in a buffer and generating a hash lookup structure and a value lookup structure for the bucket, the hash lookup structure being configured and operative to identify an entry of the bucket based on collision portion, the value lookup structure being configured and operative to identify an entry of the bucket based on value. For each update of the set of updates, a value of the update is applied to the value lookup structure to identify a corresponding entry, and the entry in the buffer is modified as required by the update. Subsequently the bucket in the buffer is persisted back to the hash table using the hash lookup structure. The process is repeated for all buckets of the hash table in a complete update or "hardening" cycle.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views.

DETAILED DESCRIPTION

Overview

The disclosed technique relates generally to systems employing persistent (i.e., non-volatile) hash tables as specialized data structures, and more particularly to a manner of efficiently organizing a hash table and applying updates to it. An example system is a data storage system, using such a hash table as part of a non-volatile disk cache, and more particularly as a deduplication ("dedupe") index used for data deduplication, which is a generally known data reduction technique. In this use, the hash key is a so-called "fingerprint" of a data page, i.e., a value calculated from a data page according to a fingerprint function and used to identify and manipulate shared data pages in the deduplication logic.

A hash table such as a dedupe index generally requires updates of some type, which may include removing entries and updating entries, for example in storage system operations such as decrement to zero and defragmentation. In order for the storage system to be able to perform updates on dedupe index entries, fingerprints are required for all pages. Generally, the fingerprints may all be stored and thus readily accessible, or they may be generated as needed by reading the data pages, decompressing them, and applying the fingerprint calculation to obtain the fingerprints. If a storing approach is used, it may be expensive and inefficient in terms of memory utilization, while a re-generating approach uses compute resources and may adversely affect system performance.

The present technique employs a specialized manner of storing hash keys, by decreasing the stored part to only "bucket bits" that identify a bucket, and an update technique that can efficiently execute updates without requiring the rest of the hash key bits. Basically, for each hash only the bucket bits are stored in an update log, and a destager manages updates from the update log to a bucket using the hash value, and not the hash key. This produces a significant reduction of space required to store keys. Space is saved both in the hash table (reduced space of the key stored per entry), as well as for the log.

DESCRIPTION OF EMBODIMENTS

Figure 1:
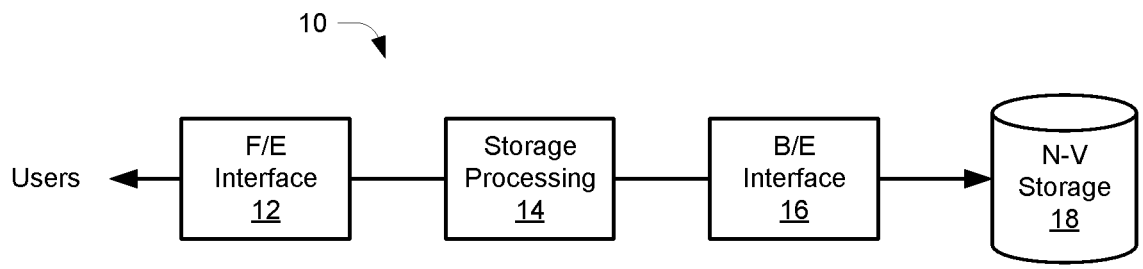
FIG. 1 is a hardware-focused block diagram of a data storage system.

FIG. 1 shows an example data storage system 10 from a hardware perspective, including a front-end (F/E) interface 12, storage processing circuitry 14, a back-end (B/E) interface 16, and non-volatile storage 18 (such as magnetic disk, Flash memory, etc.). The data storage system 10 provides data storage services to separate systems, such as host computers, network-connected computers etc., which are shown as "Users". Functional aspects of these services are realized by the storage processing 14 executing corresponding data storage application software, using the N-V storage 18 for data storage (via the B/E interface 16) and communicating with the Users via the F/E interface 12, as generally known.

Figure 2:
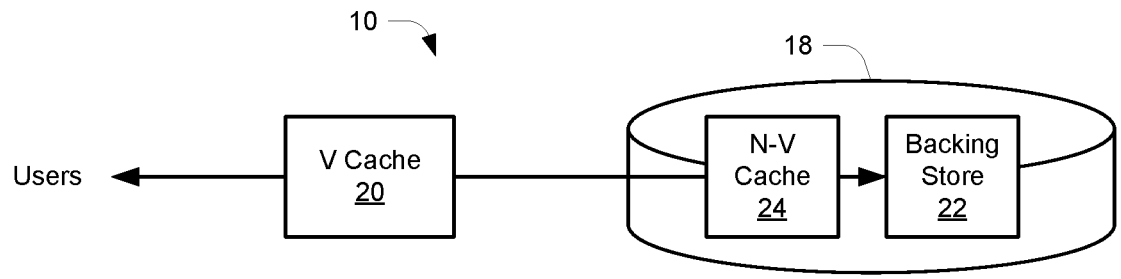
FIG. 2 is a functional-focused block diagram of a data storage system.

FIG. 2 illustrates certain functional organization of the data storage system 10, realized by the hardware of FIG. 1 under execution of the data storage application software as mentioned above. This organization includes a user-facing volatile cache (V Cache) 20, and a backing store 22 and non-volatile (N-V) cache 24 residing on the N-V storage 18. The backing store 22 provides long-lived persistent secondary storage of objects such as files, databases, etc. as generally known. The two caches 20, 24 are used in operation to enhance performance by reducing average latency of data access. The V cache 20 is typically memory based and provides very fast access but relatively limited storage capacity. Also due to its volatility, its contents are lost in the event of a power failure, restart, etc. The N-V cache 24 is typically much larger and has the benefit of non-volatility, with generally longer access latency. Caching software manages cache operations including prefetching (read-ahead) and destaging (write-back or write-through) as generally known in the art.

Figure 3:
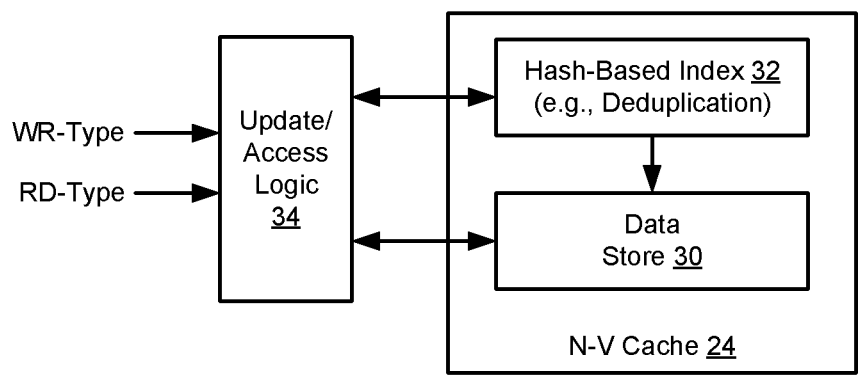
FIG. 3 is a block diagram of a non-volatile disk cache employing a persistent hash table.

FIG. 3 shows certain structure related to the N-V cache 24. It includes a data store 30 and a hash-based index 32, which in one embodiment is a deduplication (dedupe) index. These are managed/used by update/access logic 34 in response to requests generated in the course of system operation. The requests are shown as including write-type (WR-type) requests and read-type (RD-type) requests respectively. A read-type request is used for accessing data stored in the N-V cache 24, e.g., in connection with servicing a read-type data request from a user. A write-type request is used for modifying the contents of the N-V cache 24, and may be of several types. The present description focuses on two particular write-type requests, which are referred to as "updates" and "additions". Additional details are provided below.

At a high level, the hash-based index 32 provides a mapping from an identification of a data page (e.g., a fingerprint) to an address of a single, generally shared, instance of the data page in the data store 30. Thus the index 32 can be viewed as a set of mappings (Key:Value) for a stored set of data pages, with Key being a fingerprint and Value being a page address, in the deduplication usage. In one embodiment, the Key may be a 64-bit (8-byte) value calculated from a 4 KB data page, for example.

Figure 4:
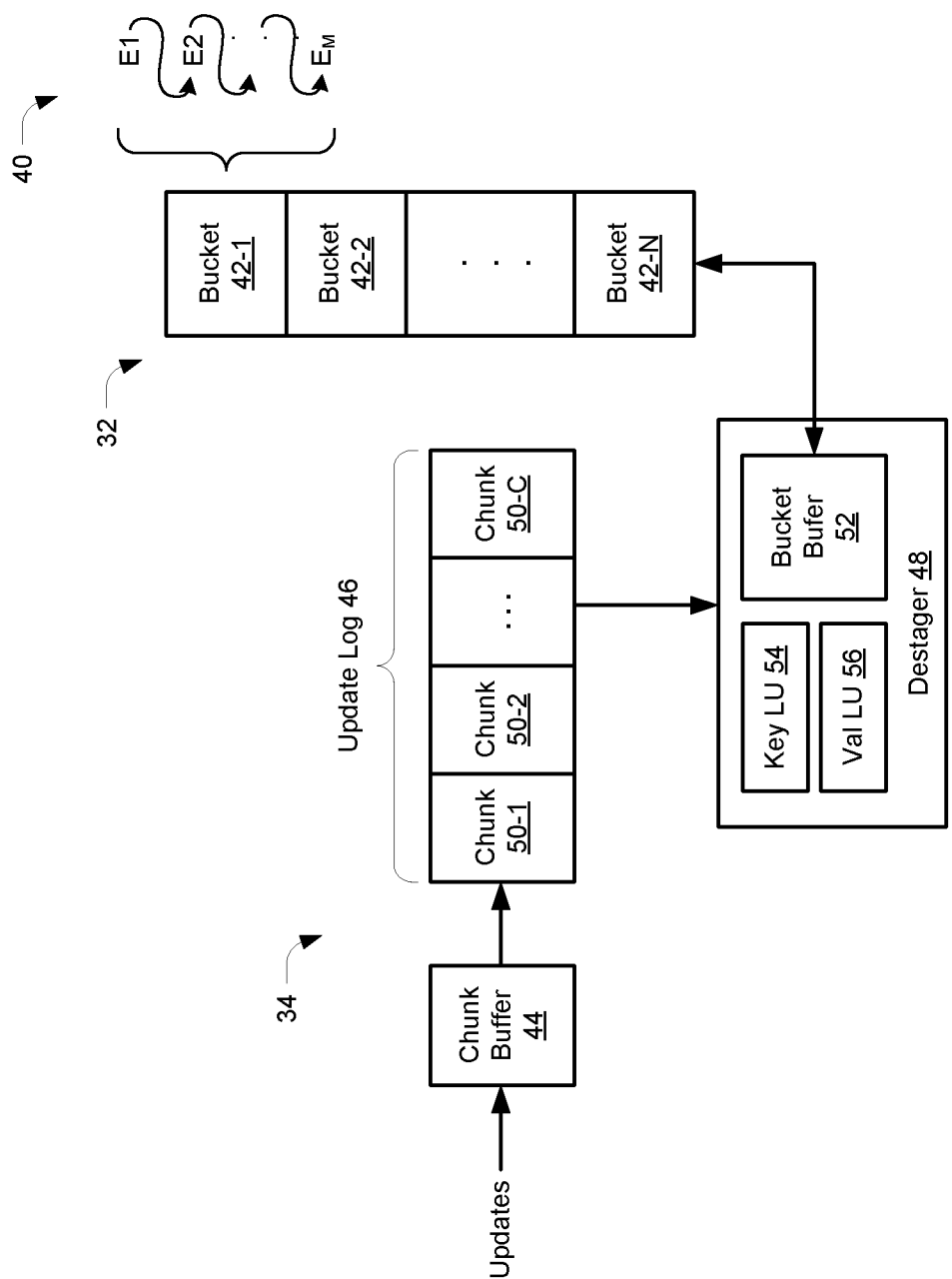
FIG. 4 is a schematic diagram of organization of the hash table and update logic.

FIG. 4 shows details of the hash-based index 32 and update/access logic 34. The hash-based index 32 is a large array of entries Ex 40 arranged into fixed-size sections referred to as "buckets" 42. Individual buckets 42 are directly identified by the value of "bucket bits" of the hash key, as described more below. Within each bucket 42, the entries 40 are arranged in some manner to facilitate the identification of a specific entry as needed in operation. In one embodiment this arrangement is in the form of a linked list, which is indicated by a set of curving arrows at upper right in FIG. 4.

Due to the bucket structuring of the hash-based index 32, the hash key can be viewed as having a structure as follows:

[Bucket Bits|Collision Bits], where the Bucket Bits are some number of most-significant bits that identify the buckets 42, and the Collision bits are the remaining, least-significant bits that distinguish among multiple entries 40 that may be stored in a given bucket 42.

As mentioned, one aspect of the disclosed technique is its use of the bucket bits only, rather than the complete hash key, and corresponding savings of storage space. The savings may be even more significant in applications using multiple hashes per page to support different types of modes of access. For example, multiple hashes per page may be required for different dedupe modes (e.g.: similarity, unaligned) that may be supported by the data storage system 10.

As an illustrative example, the hash key may be a 64-bit hash value, divided into 32 bucket bits and 32 collision bits. If the size of the buckets 42 is 4 KB, then a dedupe index of 16 TB can be represented. If only the bucket bits are stored, then the space required for hash key storage is one-half what would be required if full hash keys were stored. The savings may be even more significant if multiple hashes are required for different modes as mentioned above. If three modes are supported, for example, then there are 24 bytes of keys for each 4K page (without considering compression, which will make this ratio worse), which could be considered too costly. This is reduced to 12 bytes by using only the bucket bits (and possibly less, if fewer bucket bits are used for an index smaller than 16 TB). In alternative embodiments, the hash value may have some other number of bits, and/or the division into bucket bits and collision bits may be different.

Referring again to FIG. 4, the update/access logic 34 includes a chunk buffer 44, update log 46, and destager 48. The chunk buffer 44 is used to store a number of update entries as they are generated for updates, organized into a fixed-size region called a "chunk", and the update log 46 is used to collect several chunks 50 (50-1, 50-2, . . . , as shown) for batch-type updating of the hash-based index 32. Generally the chunk buffer 44 collects updates for multiple different buckets 42 of the hash index 32, and once the chunk buffer 44 is filled its contents are used to create a new chunk 50 in the update log 46. In one embodiment, a chunk size of 2 MB is used, which is 512 4-KB pages. Each update is of a given fixed size, such as 16 bytes, and each 4 KB in each chunk 50 contains a header of 16 bytes in which the update action is indicated. In such an example, each chunk 50 includes 130560 update entries. The update entries in each chunk 50 of the update log 46 are sorted in bucket order, to facilitate updating of successive buckets across all chunks 50 of the update log 46 as described below.

For present purposes, the entries in a chunk 50 are of two types:
1. Remove entry—An entry was removed (corresponds with decrement to zero for dedupe index example). The entry includes the bucket bits of the hash and the value to be removed (Bucket bits, Value).
2. Change value—The value of an entry is changed (corresponds with defragmentation for dedupe index example). The entry includes the bucket bits of the hash, the original value, and the new value (Bucket bits, Old value, New value).

Also shown in FIG. 4 is a destager 48 which includes a bucket buffer 52, a key lookup (LU) structure 54, and a value lookup (LU) structure 56. During destaging, the destager 48 reads and processes successive buckets 42 of the persistent hash index 32 for updates, using the bucket buffer 52 to store a bucket 42 and apply updates from the update log 46 to it before writing the updated bucket back into the index 32. As described more below, the Key LU 54 and Value LU 56 are generated for each bucket 42 at the beginning of update processing, and they are used to provide for fast and efficient access to individual entries.

In common destager designs, updates are strictly sorted, managed and searched by the hash key. This helps enforce the destager to enforce a collision policy when destaging from an above level of the hash table. Additionally, it might be desirable for the output of the destager to be sorted in some manner by hash so it will be possible to perform efficient lookup in its buckets.

In the present technique, the destager 48 generates the Value LU structure 56 indexed by the hash value, so that lookups can be performed by value in an efficient manner. For other functions, such as addition of new entries and for efficient collision policy enforcement, it is also desirable to have the bucket 42 in an additional data structure indexed by hash key. That is the purpose of the Key LU structure 54.

Figure 5:
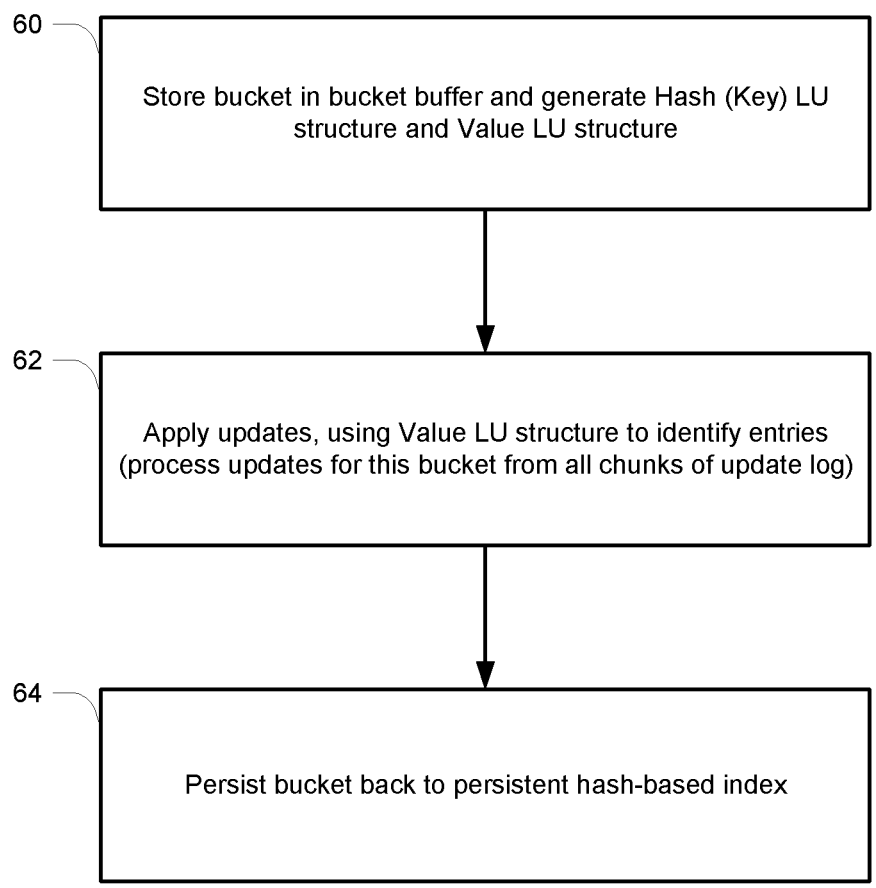
FIG. 5 is flow diagram of a process of updating the hash table.

FIG. 5 illustrates the destaging process for a single bucket 42. It will be appreciated that this process is repeated for each bucket 42 of the hash-based index for a given update cycle, which may also be referred to as a "hardening" cycle in reference to its function of committing updates to persistent storage. A given update cycle may be performed in one continuous process or divided into smaller pieces that are performed in sequence according to some schedule. Successive update cycles occur based on a schedule, such as once per hour for example.

At 60, the destager 48 initially reads a bucket 42 from the persistent index 32 and stores the bucket 42 in the bucket buffer 52, then processes the bucket contents to generate the Key LU structure 54 (also referred to as Hash LU structure) and the Value LU structure 56. The Hash/Key LU structure is usable to identify an entry of the bucket 42 based on the hash key, while the Value LU structure is usable to identify an entry of the bucket 42 based on value. In the case of a dedupe index, the value is the address of a shared data page in the data store 30, At 62, the updates are applied to the bucket 42 in the buffer 52. For each update of the set of updates in the update log 46, a value of the update is applied to the Value LU structure 56 to identify a corresponding entry, and the entry (in the buffer 52) is modified as required by the update. Example specific are given below. In one embodiment, all updates for this bucket 42 across all chunks 50 are applied, which makes efficient use of the buffering of the bucket at 60 (i.e., multiple updates per single read of the bucket 42, minimizing write amplification). The per-bucket ordering of the updates in each chunk 50, as mentioned above, enables the destager 48 to easily obtain the per-bucket updates.

At 64, upon completion of all updates to the bucket 42 in the buffer 52, the bucket 42 is written back to the persistent hash-based index (also referred to as "persisting" the bucket 42).

Applying the updates at 62 may differ depending on the type of update. A Change update will have a bucket ID (bucket bits), a current value, and a new value. The entry is first looked up by its current value, and the value is changed to the new value. A Remove update will have a bucket ID (bucket bits) and a current value. The entry is looked up by its current value, and then removed.

In addition to the updates at 62, the destager may also process the addition of new entries generated by a preceding operational level of the system. New entries are added based on their Hash/Key, applied to the Hash/Key LU structure 54.

In a complete update or hardening cycle, the steps 60-64 are repeated for each bucket 42 of the index 32. As mentioned, this may occur in one long task of distributed time-wise in some manner. The bucket ordering of entries in the chunks 50 facilitates the per-bucket update process. For example, simple per-chunk pointers may be used that simply advance stepwise through the entries. During an execution of step 62, the pointers advance through the chunk entries for the bucket 42 being processed, and move to the beginning of a next set of entries for use when a subsequent bucket 42 is processed.

The following are features/aspects of the disclosed technique that may require supplemental functionality to accommodate in a real system:

1. As a full hash compare is not performed before performing an update (since the full hash is not stored), it is possible that an inaccurate update is made in case the same hash value coincidently exists in a bucket having an update applied. For this reason, the disclosed technique may be better suited for applications in which the entries of the hash table store values guaranteed to be unique at least within the scope of each bucket 42, if not globally (such as data deduplication, for example).

2. The full hash might be needed for things which aren't index updates—an example for this might be for validation of the data consistency, or for some sort of delayed work with the hash table (e.g.: late dedupe). This could be accommodated by re-generating hashes as needed.

While various embodiments of the invention have been particularly shown and described, it will be understood by those skilled in the art that various changes in form and details may be made therein without departing from the scope of the invention as defined by the appended claims.

What is claimed is:

1. A method of applying a set of updates to a multi-entry bucket of a persistent multi-bucket hash table, the hash table being indexed by a hash index having a bucket portion and a collision portion, the bucket portion identifying a bucket, each entry of each bucket storing a corresponding value, the method comprising:

initially storing the bucket in a buffer and generating a hash lookup structure and a value lookup structure for the bucket, the hash lookup structure being configured and operative to identify an entry of the bucket based on collision portion, the value lookup structure being configured and operative to identify an entry of the bucket based on value;

for each update of the set of updates, applying a value of the update to the value lookup structure to identify a corresponding entry in the buffer, and modifying the identified entry in the buffer as required by the update; and subsequently persisting the bucket in the buffer back to the hash table using the hash lookup structure.

2. The method of claim 1, wherein the entries of the hash table store values guaranteed to be unique at least within a scope of each bucket.

3. The method of claim 2, wherein the hash table is a deduplication index used in connection with de-duplicated storage of data pages, and the hash table values identify corresponding unique instance of data page values.

4. The method of claim 1, wherein the hash table is a hash-based index of a non-volatile disk cache of a data storage system, and the value of each entry is an address of a corresponding page of data storage of the data storage system.

5. The method of claim 4, wherein the hash-based index is a deduplication index used in connection with a fingerprint function mapping values of data pages to corresponding fingerprints, each fingerprint being a corresponding hash index, and wherein the hash table values identify corresponding unique instance of data page values.

6. The method of claim 4, wherein the updates include a Remove update and a Change update, a Remove update indicating removal of entry and including the bucket portion and value for the entry to be removed, a Change update indicating change of the value of an entry and including the bucket portion, an original value, and a new value.

7. The method of claim 1, wherein the updates are stored in an update log containing a plurality of chunks each containing updates from a chunk buffer used to collect a series of updates, and wherein the set of updates for a given bucket are distributed among the chunks of the update log.

8. The method of claim 7, wherein the updates in each chunk of the update log are arranged in bucket order to facilitate identification of the updates for the bucket.

9. The method of claim 1, wherein the storing, applying and persisting steps are repeated for each bucket of the hash table for a complete update cycle, the complete update cycle being performed in either one continuous process or divided into smaller pieces performed according to a schedule.

10. A system having non-volatile memory storing a persistent multi-bucket hash table used in operation of the system, the hash table being indexed by a hash index having a bucket portion and a collision portion, the bucket portion identifying a bucket, each entry of each bucket storing a corresponding value, the system including update logic configured and operative to apply a set of updates to a multi-entry bucket of the hash table by a method including:

initially storing the bucket in a buffer and generating a hash lookup structure and a value lookup structure for the bucket, the hash lookup structure being configured and operative to identify an entry of the bucket based on collision portion, the value lookup structure being configured and operative to identify an entry of the bucket based on value;

for each update of the set of updates, applying a value of the update to the value lookup structure to identify a corresponding entry in the buffer, and modifying the identified entry in the buffer as required by the update; and subsequently persisting the bucket in the buffer back to the hash table using the hash lookup structure.

11. The system of claim 10, wherein the entries of the hash table store values guaranteed to be unique at least within a scope of each bucket.

12. The system of claim 11, wherein the hash table is a deduplication index used in connection with de-duplicated storage of data pages, and the hash table values identify corresponding unique instance of data page values.

13. The system of claim 10, wherein the hash table is a hash-based index of a non-volatile disk cache of a data storage system, and the value of each entry is an address of a corresponding page of data storage of the data storage system.

14. The system of claim 13, wherein the hash-based index is a deduplication index used in connection with a fingerprint function mapping values of data pages to corresponding fingerprints, each fingerprint being a corresponding hash index, and wherein the hash table values identify corresponding unique instance of data page values.

15. The system of claim 13, wherein the updates include a Remove update and a Change update, a Remove update indicating removal of entry and including the bucket portion and value for the entry to be removed, a Change update indicating change of the value of an entry and including the bucket portion, an original value, and a new value.

16. The system of claim 10, wherein the updates are stored in an update log containing a plurality of chunks each containing updates from a chunk buffer used to collect a series of updates, and wherein the set of updates for a given bucket are distributed among the chunks of the update log.

17. The method of claim 16, wherein the updates in each chunk of the update log are arranged in bucket order to facilitate identification of the updates for the bucket.

18. The system of claim 10, wherein the storing, applying and persisting steps are repeated for each bucket of the hash table for a complete update cycle, the complete update cycle being performed in either one continuous process or divided into smaller pieces performed according to a schedule.

* * * * *